(No Model.)
J. J. CROOKE.
PROCESS OF AND APPARATUS FOR EXTRACTING SILVER FROM ITS ORES.
No. 541,659. Patented June 25, 1895.
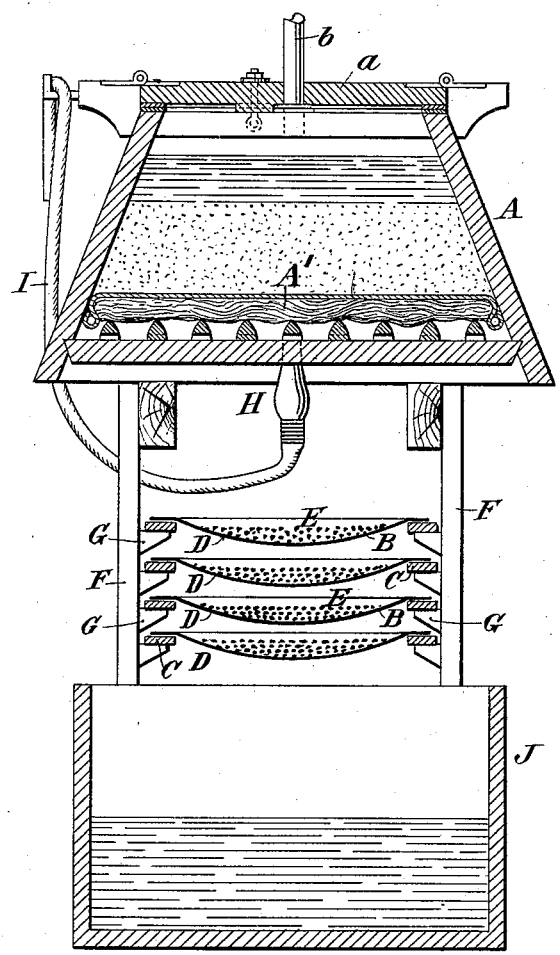
Witnesses
Raphael Netter
James N. Cattow
Inventor
John J. Crooke
by Duncan & Page, Attorneys

UNITED STATES PATENT OFFICE.

JOHN J. CROOKE, OF NEW YORK, N. Y.

PROCESS OF AND APPARATUS FOR EXTRACTING SILVER FROM ITS ORES.

SPECIFICATION forming part of Letters Patent No. 541,659, dated June 25, 1895.

Application filed March 2, 1895. Serial No. 540,294. (No model.)

*To all whom it may concern:*

Be it known that I, JOHN J. CROOKE, a citizen of the United States, residing in the city, county, and State of New York, have invented certain new and useful Improvements in Processes of and Apparatus for Extracting Silver from Its Ores, of which the following is a specification, reference being had to the accompanying drawing, forming a part of the same.

The present invention relates to the treatment of argentiferous ores for the extraction of silver and any small percentage of gold contained therein, and it may be regarded as an improvement on the well known Augustin process, which is based on the conversion of the sulphides of silver to chlorides, by roasting the ores with an alkaline chloride, chloride of sodium being generally used for this purpose. The ores in the Augustin process, after roasting sweet, are leached with a hot saturated solution of chloride of sodium and water, which dissolves the chlorides of silver, and the silver is then recovered from the filtered solution by exposure to metallic copper. Although this process has been used for the extraction of silver from mattes and certain varieties of ores, its application as a commercial method has been for serious reasons very limited, some of the reasons being as follows: The prolonged roasting necessary to convert all the contained silver to chloride causes a loss of silver amounting to from ten to twelve per cent. Silver bearing ores are also generally associated with base metallic elements, especially lead and iron, which are converted to a considerable extent, by the prolonged and intense heat of the roasting operation, to chlorides which load and foul the solution, and render it ineffective to dissolve the chloride of silver. These base metallic compounds are also continually passing from a soluble to an insoluble condition and are deposited upon the copper with the silver and gold, thus seriously interfering with the recovery of the precious metals. These defects, especially the loss of silver in the roast, have prevented its economic use, particularly for the treatment of the various diverse argentiferous ores which largely constitute the sources of silver in this country.

It is one of the objects of the present invention to remedy these defects in the above described process and adapt it to the treatment of all argentiferous ores, as well as all argentiferous by-products, even when such ores and products are largely associated with lead and other base metals; and to this end, I have especially directed my attention to the improvement of the composition and management of the leaching solution, and have perfected the same so that I am able to materially diminish the heat and duration of the roasting step of the process and thereby prevent the great loss of silver and gold, while these metals are easily reduced to a soluble condition, and recovered from the solution, without appreciable loss, by the action of metallic copper and iron or other suitable agents. To accomplish this object I prefer to prepare the leaching solution as follows: Chloride of sodium is dissolved in water to saturation. To every one thousand gallons of this solution I add thirty pounds of a solution of nitrate of copper, preferably of a specific gravity indicating 100° by the ordinary salometer, or about 25° by Baumé's hydrometer, the brine solution and the nitrate of copper solution being both preferably brought to same density. I now add to every three thousand gallons of this solution twenty pounds of sulphuric acid. This amount of acid will not precipitate the lead as sulphate in the tailings, but will prevent the iron from becoming basic. The presence of the nitrate of copper and sulphuric acid in their re-actions on the chloride of sodium in the solution will furnish the necessary chlorine to keep the chloride of lead soluble in the menstruum as plumbic chloride. This salt will pass the filter, and will not be detained by the metallic copper if used, nor contaminate the silver and gold. The lead can be removed from the filtrate by subsequent treatment more fully hereinafter described.

The presence of nitrate of copper in conjunction with the chloride of sodium and sulphuric acid in the solution is of the utmost importance, especially as effecting the degree and manner of roasting the ores. The liberation in the solution of one of the most powerful oxidizing agents known to science, the nitric peroxide or peroxide of nitrogen, permits a superficial chlorination of the silver in the roasting furnace. The heat need never be brought to redness. It should never even approach the volatilizing point of chloride of silver, and the ores can be passed through the furnace with the utmost rapidity. The nitric peroxide in the solution will cover all defects of furnace chlorination, and bring the silver and gold into the condition of soluble chlorides without appreciable loss.

It is also the object of my invention to provide improved means for recovering the silver and gold from the solution by passing it directly from the leaching tank filter through a series of filters containing metallic copper (preferably cement copper), which filters are arranged one above the other, so that the filtrate from each upper filter will be discharged upon the next lower one of the series, the filters being also removably and interchangeably arranged upon their supporting rack for the purposes hereinafter set forth. When the solution carries gold the copper cement in the filter is supplemented with a few strips of soft sheet iron. The iron will, when in contact with the solution, give off hydrogen which, combining with the chlorine of the gold to form hydrochloric acid, will allow the gold to precipitate with the silver in a metallic condition.

In the accompanying drawing I have shown a series of filters arranged in proper relation to a leaching tank and a precipitating tank, the parts being shown in vertical cross-section, in which—

A represents a leaching tank in shape of a truncated cone, preferably made steam and gas tight, and provided with a manhole $a$, and a pipe $b$ for the admission of steam, of a capacity of about fifteen tons of roasted ores and an equal weight of leaching solution, the tank being provided with a filter A' of any suitable construction.

B is a series of filters, preferably four or more in number, arranged one above the other and in such relation to the leaching tank A that the solution as it passes the filter A' of the leaching tank can be delivered directly upon the upper filter of the series.

The filters B may be of cheap construction, consisting of a square or rectangular frame C, and stout canvas D well secured at its edges to the frame, but sufficiently slack to permit it to bag down to form a receptacle for the cement copper E. They are supported upon a rack F, provided with brackets G, on which they can be readily slid to place them in working position or to remove them for taking off the silver and gold or for cleaning and recharging. About forty pounds of cement copper should be loaded upon each filter, and the charge should be renewed as frequently as the richness of the ores in silver require. As a very large proportion of the silver and gold in the solution will be deposited upon the upper filter of the series B, this filter may be removed and the next lower filter, which is the next richest in precious metals, be substituted for it, all of the lower filters being moved up one step, whereby the copper is gradually replaced by the precious metals, until the deposit of these metals upon the upper filter is sufficiently thick to be readily removed as a coherent sheet of nearly pure metal for melting or casting into bars.

H is the exit of the leaching tank to which is attached a flexible hose I, as a convenient means for closing and opening the exit.

J is a receiving and precipitating tank which is located directly beneath the series of filters B to receive the solution as it passes the lower filter.

The preferred method of carrying out my process by the use of the means described is as follows: Raw ores, pulverized to from forty to fifty mesh, are mixed with chloride of sodium, the percentage depending upon the richness of the ores in silver, but from four to eight per cent. of chloride of sodium to the weight of the ore is generally sufficient to convert the silver and the small quantity of gold in the ores to chlorides. This mixture is calcined or roasted in any furnace adapted for the purpose, though I prefer to use a furnace of the reverberatory type, inasmuch as it is more easily controlled in the application of heat. As this process possesses the novelty of requiring only a very low temperature for roasting or calcining the ores with chloride of sodium, it is absolutely necessary to have the heat under perfect control. A forty foot furnace is capable of preparing twenty tons every twenty-four hours. The roasted charge as it is drawn from the furnace is preferably heaped upon a cooling floor where it should be allowed to remain undisturbed until its temperature has fallen to about 150° Fahrenheit, and is then trammed to the leaching tanks, where it is treated with an equal weight of a hot saturated solution of chloride of sodium, nitrate of copper, and sulphuric acid, in the proportions heretofore mentioned. About three thousand gallons of this solution is sufficient to treat fifteen tons of the prepared and roasted ore. The solution when laundered into the lixiviation tank containing about fifteen tons of prepared ore will cover the charge, and should be about twelve inches above its surface. I prefer that the temperature of the solution should be about 170° Fahrenheit, and that it should stand on the charge about one hour. At the end of this time the hose beneath the diaphragm of the tank is lowered, and the filtered solution is discharged upon the upper filter of the series of filters constructed as hereinbefore set forth, containing cement copper and a few strips of iron (if the solution contains gold), the filtrate passing through the entire series of filters from top to bottom with a final delivery in the tank beneath. If the solution is properly prepared all the silver and gold will be deposited upon the cement copper and iron on the filters in a nearly pure metallic condition, and the metal upon the upper filter will form a sufficiently thick coherent coating to permit it to be readily rolled off from the copper. As hereinbefore described, the filters are made interchangeable in position so that each may be enriched to a point where the coating of silver and gold can be easily removed, and this also enables the enriched filters to be removed and others substituted. The filtrate, after it has passed through the series of filters, and has been freed of its silver and gold, as above described, is delivered into the receiving tank, which contains metallic iron, by which the copper (which has been replaced by the silver and gold) is recovered, and can again be placed upon the filters for re-use.

The iron employed for the precipitation of the copper, as also that derived from the ores, gradually loads the solution with ferrous salts, but if the solution be kept in an acid condition, it can be re-used an indefinite number of times without materially affecting its efficiency to dissolve silver and gold chlorides.

Whenever the solution becomes loaded with sulphate of soda, iron salts, or chloride of lead, to a degree to materially affect its efficiency as indicated by a gravity of from 120° to 140° brine test, these salts, or any of them, may be removed by any means adapted to accomplish this result.

It is apparent that the practical value of the above described process largely resides in keeping the solution in a state of permanent power to fully dissolve and retain all the silver and gold as chlorides until these metals are recovered in their metallic state. The method of treating the solution as detailed above will effectually maintain its power for an indefinite period of time, and by the practice of the process in a large way, and as above described, I have succeeded in extracting more than ninety-nine per cent. of the assay value of silver and gold in sulphide ores and furnace mattes.

I do not claim that this process is applicable to ores very rich in gold, but that it is especially advantageous to ores rich in silver, which generally carry from one-tenth to one-half ounce in gold, and when such ores are treated in charges of from seven to fifteen tons, from ninety-nine per cent. to clean of all the silver and gold can be extracted.

I do not desire to limit my invention to the use of any special form or construction of roasting furnace, or lixiviating tanks or filters, as all these can be varied materially from those described and shown in the drawing, without departing from the principles of my invention, as is evident to those skilled in the art of working silver ores, nor do I wish to limit the invention to the use of the proportions of the ingredients set forth herein, as I am aware that good commercial results can be obtained when the preferred proportions are materially changed. Neither do I wish to limit my invention to the use of metallic copper for recovering the silver from the solution, or metallic iron for recovering the gold therefrom, as both the silver and gold may be recovered from the solution by any other well-known means. Neither do I wish to limit my invention to the treatment of silver bearing ores in their native condition, since my process is equally applicable to the treatment of silver mattes generally produced by roasting and smelting the ores to eliminate foreign materials therefrom and to enrich them in silver.

I consider that the main, novel and important features of my invention consist in the use of nitrate of copper in the lixiviating solution by means of which the degree of heat and the time required for roasting the ores are greatly diminished with no appreciable loss of silver or gold, and the silver and gold are fully converted into soluble chlorides in the lixiviating tank.

What is claimed as new is—

1. The herein described process of extracting silver from its ores which consists in roasting the ores with chloride of sodium, treating the roasted mass with a hot aqueous solution containing chloride of sodium, nitrate of copper and sulphuric acid, and recovering the silver from the solution.

2. The herein described process of extracting silver from its ores, which consists in roasting the ores with chloride of sodium, leaching the roasted mass with a hot aqueous solution containing chloride of sodium, nitrate of copper and sulphuric acid, and exposing the solution to the action of metallic copper, whereby the silver contained in the ores is converted into a chloride, is dissolved by the solution and is deposited upon the copper.

3. The herein described process of extracting silver from ores containing lead, which consists in roasting the ores with chloride of sodium, leaching the roasted mass with a hot aqueous solution containing chloride of sodium, nitrate of copper and sulphuric acid, the quantity of the latter not being sufficient to precipitate the lead as sulphate, whereby the lead will be converted into chloride and pass the filter in that condition, and exposing the solution to the action of metallic copper to deposit the silver therefrom.

4. The herein described process of extracting silver from ores containing lead, which consists in roasting the ores with chloride of sodium, leaching the roasted mass with a hot aqueous solution containing chloride of sodium, nitrate of copper and sulphuric acid, the quantity of the latter not being sufficient to precipitate the lead as sulphate, whereby the lead will be converted into chloride and pass the filter in that condition, and exposing the solution to the action of metallic copper to deposit the silver therefrom, and afterward precipitating the lead from the solution to prepare it for re-use.

5. In an apparatus for extracting silver from its chloride solution, a series of filters removably and interchangeably arranged one above the other below a leaching tank and above a receiving tank and carrying cement copper, whereby the solution will pass from the leaching tank directly through the series of filters and be discharged into the receiving tank and the silver will be deposited upon the copper in the filters, and the lower filters of the series be easily removed and advanced upward, as set forth.

JOHN J. CROOKE.

Witnesses:
RICH. J. BOLLES,
ALTON L. DICKERMAN.